United States Patent
Dinha et al.

(10) Patent No.: US 10,185,599 B2
(45) Date of Patent: Jan. 22, 2019

(54) KERNEL MODE ACCELERATOR

(71) Applicant: OpenVPN Technologies, Inc., Pleasanton, CA (US)

(72) Inventors: Francis Dinha, Dublin, CA (US); James Yonan, Pleasanton, CA (US)

(73) Assignee: OpenVPN Technologies, Inc., Pleasanton, CA (US)

( * ) Notice: Subject to any disclaimer, the term of this patent is extended or adjusted under 35 U.S.C. 154(b) by 179 days.

(21) Appl. No.: 15/178,171

(22) Filed: Jun. 9, 2016

(65) Prior Publication Data
US 2017/0013015 A1    Jan. 12, 2017

Related U.S. Application Data

(60) Provisional application No. 62/189,715, filed on Jul. 7, 2015.

(51) Int. Cl.
*H04L 29/06* (2006.01)
*G06F 9/54* (2006.01)

(52) U.S. Cl.
CPC ............ *G06F 9/54* (2013.01); *H04L 63/0272* (2013.01)

(58) Field of Classification Search
CPC .................................................. H04L 63/0272
See application file for complete search history.

(56) References Cited

U.S. PATENT DOCUMENTS

| | | | | |
|---|---|---|---|---|
| 2008/0304485 A1* | 12/2008 | Sinha | ..................... | H04L 12/66 370/392 |
| 2010/0322237 A1* | 12/2010 | Raja | ....................... | H04L 43/02 370/389 |
| 2011/0023090 A1* | 1/2011 | Asati | .................... | H04L 12/4633 726/4 |
| 2012/0054650 A1† | 3/2012 | Bliss et al. | | |
| 2012/0226804 A1† | 9/2012 | Raja et al. | | |
| 2013/0125230 A1* | 5/2013 | Koponen | ............ | H04L 41/0823 726/13 |
| 2014/0355762 A1* | 12/2014 | Zhang | ................... | H04W 12/02 380/270 |
| 2016/0006696 A1* | 1/2016 | Donley | ............... | H04L 63/0236 709/223 |
| 2016/0337857 A1* | 11/2016 | Carron | ................ | H04L 63/0428 |
| 2017/0222889 A1* | 8/2017 | Zong | ................... | H04L 41/5051 |

* cited by examiner
† cited by third party

*Primary Examiner* — Ghodrat Jamshidi
(74) *Attorney, Agent, or Firm* — Peter Tormey; Antero, Tormey & Petrin, PC

(57) ABSTRACT

A system and method for disposing, in kernel space, a data plane having instructions operable to encrypt and transfer data over a network. The data plane is coupled to a control plane which resides in user space. The control plane has instructions operable to control the transfer of the encrypted data in kernel space. Certain embodiments include an application programming interface (API), which operates to expose a programming interface for encrypted communications which results in a more efficient data transfer because most of the data processing is done in kernel space.

10 Claims, 1 Drawing Sheet

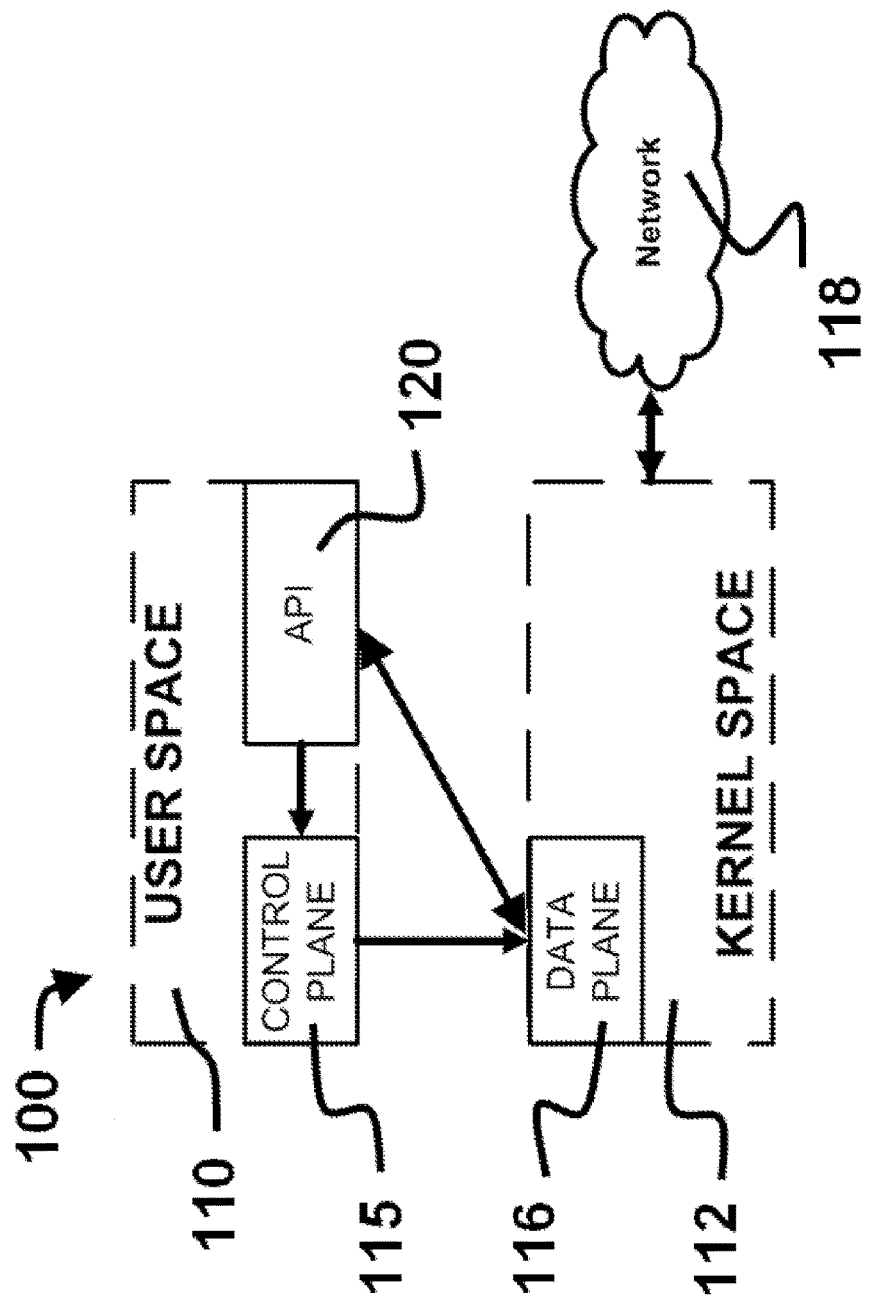

KERNEL MODE ACCELERATOR

PRIORITY

This application claims the benefit of provisional patent application 62/189,715 entitled Kernel Mode Accelerator, filed by the same inventors on Jul. 7, 2015, which, together with its appendix, is hereby incorporated as if fully set forth herein.

BACKGROUND

In processing systems, Kernel space is conventionally strictly reserved for running a privileged operating system kernel, kernel extensions, and most device drivers. In contrast, user space is the memory area where application software and some drivers execute. Each user space process normally runs in its own virtual memory space, and, unless explicitly allowed, cannot access the memory of other processes. This is the basis for memory protection in modern operating systems, and a building block for privilege separation.

Conventionally, virtual private network (VPN) implementations reside exclusively in either user space or kernel space. Conventional implementations such as secure sockets layer (SSL), transport layer security (TLS), virtual private networks (VPNs) and OpenVPN typically reside in user space. Other conventional implementations such as Internet Protocol Security (IPSec) and Layer Two Tunneling Protocol (L2TP) run exclusively in kernel space.

Because operating systems restrict operations in kernel space, secure communications are easier to implement in user space. However, user space only has limited access to the resources available in kernel space, thereby hampering efficient operation.

BRIEF DESCRIPTION OF THE DRAWINGS

FIG. 1 shows a block diagram of a processor operating space.

SUMMARY

Disclosed herein is a system and method for disposing, in kernel space, a data plane having instructions operable to encrypt and transfer data over a network. The data plane is coupled to a control plane which resides in user space. The control plane provides instructions operable to control the transfer of the encrypted data in the kernel space. Certain embodiments include an application programming interface (API), which operates to expose a programming interface for encrypted communications. The system and method described herein result in a more efficient data transfer because most of the data processing is done in kernel space.

Description
Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Certain embodiments may be effectuated using the information in the attached Technical Appendix which, together with its associated FIGURE, is incorporated by reference as if fully set forth herein.

The construction and method of operation of the invention, however, together with additional objectives and advantages thereof will be best understood from the following description of specific embodiments when read in connection with the accompanying drawings.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

FIG. 1 shows a block diagram of a processor operating space 100. In FIG. 1 operating memory is divided into user space 110 and kernel space 112. Kernel space 112 includes access to all processor system resources and is coupled to a network 118 such as Ethernet, the Internet, and the like.

Residing in user space is a control plane 115 which includes processor instructions for controlling secure communications and user operability. Coupled to the control plane 115 is a data plane 116. The data plane 116 resides in the kernel space 112 and provides processing of data transmission and reception operations. An application programming interface (API) 120 resides in user space and is coupled to the control plane 115 and the data plane 116.

A control plane 115, a data plane 116 and an API 120 (or management plane) may be the basic components of a telecommunications architecture. The control plane is conventionally the part of a network that carries signaling traffic and is responsible for routing. Functions of the control plane 115 may also include system configuration and management. The control plane 115 and API 120 serve the data plane 116, which bears the traffic that the network serves to carry. The API 120, which may coordinate administrative traffic, may be considered a subset of the control plane 115 in some embodiments. Each plane carries a different type of traffic and may be conceptually (and often in reality) an overlay network (a telecommunications network that runs independently on top of another one, although supported by infrastructure).

In operation, the control plane 115 is less sensitive to raw network performance because it consumes much less bandwidth than the data plane 116. Keeping the control plane 115 in user space 110 provides for interoperability with existing VPN clients and server-side authentication systems. The data plane 116 may be sensitive to overall network performance because of a need to tunnel data at the high data rates typical of a service provider environment. By offloading the data plane to kernel space, very high performance is achieved because data packets can be processed exclusively in kernel space.

Operation

According to the present embodiment, the control plane 115 operates in tandem with the data plane 116 to improve efficiency by dividing tasks between the two planes. For example and without limitation, the control plane 115 may handle an SSL component of a VPN protocol such as the authentication handshake while a data channel is maintained by the data plane 116. In this embodiment, performance-boosting does not require any changes to an existing VPN protocol, thus allowing full support of SSL/TLS security and interoperability with existing architectures, such as remote client devices.

The embodiments disclosed herein also provide for ease of installation and use. Embodiments may be effectuated solely in software using a commodity hardware/software stack. For example and without limitation, an IPSec client, in order to connect to an IPSec server, must conform to the same kernel-model implementation as the server. Implementing clients in kernel mode is extremely problematic, due to the complexity of developing kernel mode code for numerous client platforms. Here, the clients may be implemented exclusively in user space, while the server can realize all of the performance benefits of current disclosure. The clients don't even need to be aware that they are connecting to a server employing these techniques because the VPN protocol is unchanged.

Control plane 115 operations may include one or more of the following among others:
Authentication
SSL/TLS Handshake
VPN protocol handshake
Assignment of VPN tunnel configuration parameters including IP addresses, routes, and DNS servers.
By providing control and authentication operations, the control plane 15 provides for easier interaction with $3^{rd}$ party software.

Data plane 116 operations may include one or more of the following among others:
Data transfer
Encryption/decryption of VPN data packets.
Compression/decompression of VPN data packets.
Routing and NAT (Network Address Translation) of VPN data packets to and from private networks and/or the internet.
Encapsulation of VPN data packets onto a transport protocol such as UDP or TCP.
By handling the data encryption, compression, and transfer, the data plane 116 operates with low level drivers and devices to provide for faster data interchange.

In some embodiments an optimization step may be provided for determining which operations are to be handled in user space or in kernel space. This may provide for dynamic optimization in the event of changing network conditions including, but not limited to network throughput.

Certain embodiments may bind the control plane 115 and the data plane 116 with an application programming interface (API) 120. The API exposes to user space routines to control secure communications including VPN, tunneling and other operations. The operation of the API may be effectuated using a wide variety of commands. A representative, but not exhaustive, list of API commands include:

OVPN_DEV_INIT—Initialize KOVPN virtual network device.
OVPN_SOCKET_ATTACH_UDP—Attach a UDP transport socket to KOVPN.
OVPN_SOCKET_DETACH—Detach transport socket from KOVPN.
OVPN_PEER_NEW—Create a new Peer context, representing a VPN connection with a remote peer.
OVPN_PEER_NEW_WITH_SOCKADDR—Create a new Peer context with a specific endpoint pair consisting of a 4-tuple of source address, source port, destination address, and destination port.
OVPN_PEER_NEW_TCP—Create a new Peer context, representing a TCP-based VPN connection with a remote peer.
OVPN_PEER_SOCKADDR_RESET—Set or reset the endpoint pair associated with a Peer.
OVPN_PEER_DEL—Delete a Peer context.
OVPN_PEER_STATUS—Get current Peer status including bandwidth statistics and error state.
OVPN_PEER_ROUTES_ADD—Associate one or more routes with a Peer.
OVPN_PEER_KEYS_RESET—Set/reset the Peer primary and secondary session keys for encryption/decryption of VPN data packets. This operation supports "atomic" rollover of cryptographic session keys, i.e. seamless transition from old/expiring to new session keys, without the performance penalties typically associated with locking.

OVPN_PEER_KEEPALIVE—Modify "keepalive" settings used to verify ongoing peer-to-peer connectivity.

OVPN_PEER_USERSPACE_HALT—Allows user space to mark a Peer context with an error status.

OVPN_DEV_STATS—Get cumulative bandwidth statistics associated with the KOVPN virtual network device.

OVPN_ERR_STATS—Get cumulative error statistics.

Certain embodiments may be effectuated using the information in the attached appendix which is incorporated by reference as if fully set forth herein.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A method including the following:
disposing, in kernel space, a data plane, said data plane including processor-readable instructions directing the processor to encrypt and transfer data over a network;
disposing, in user space, a control plane, said control plane including processor-readable instructions directing the processor to encrypt and transfer data over the network;
disposing, in user space, an application programming interface (API), said API operable to expose a programming interface for encrypted communications,
receiving network condition information, wherein the network condition information comprises network throughput information, and
allocating encryption and data transfer operations between the data plane and the control plane in response to the network throughput information.

2. The method of claim 1 wherein said encryption and data transfer operations include at least one of authentication, VPN operations, or data compression.

3. The method of claim 1 wherein the data plane and the control plane include processor-readable instructions operable to effectuate data encapsulation.

4. The method of claim 1 wherein the control plane and the data plane include processor-readable instructions operable to effectuate secure sockets layer (SSL) security.

5. A processing device including:
a processor, said processor coupled to a memory and a network, said memory having a substantially smaller kernel space portion, and a relatively larger user space portion;
a control plane disposed in the user space and operable to effectuate encryption and transfer of data;
an application programming interface (API), said API disposed in the user space and operable to expose control of the control plane to users;
a data plane, said data plane disposed in the kernel space and operable to effectuate encryption and transfer of data;
wherein the processor receives network throughput information and
allocates encryption and data transfer operations between the data plane and the control plane in response to the network throughput information.

6. The device of claim 5 wherein either the data plane or the control plane is operable to interface with one or more VPN clients.

7. A non-transitory processor-readable storage device having processor readable code embodied on said storage device, said code for programming one or more processor to perform a method including:
disposing, in kernel space, a data plane, said data plane including processor-readable instructions operable to encrypt and transfer data over a network;
disposing, in user space, a control plane, said control plane including processor-readable instructions operable to encrypt and transfer data over the network;
disposing, in user space, an application programming interface (API), said API operable to expose a programming interface for encrypted communications,
receiving network throughput information, and
allocating encryption and transfer data operations between the data plane and the control plane in response to the network throughput information.

8. The storage device of claim 7 wherein the data plane and control plane include processor-readable instructions directing the processor to effectuate a virtual private network (VPN).

9. The storage device of claim 8 wherein the data plane and the control plane include processor-readable instructions directing the processor to effectuate data encapsulation.

10. The storage device of claim 7 wherein the control plane includes processor readable-instructions directing the processor to effectuate secure sockets layer (SSL) security.

* * * * *